Patented Sept. 14, 1937

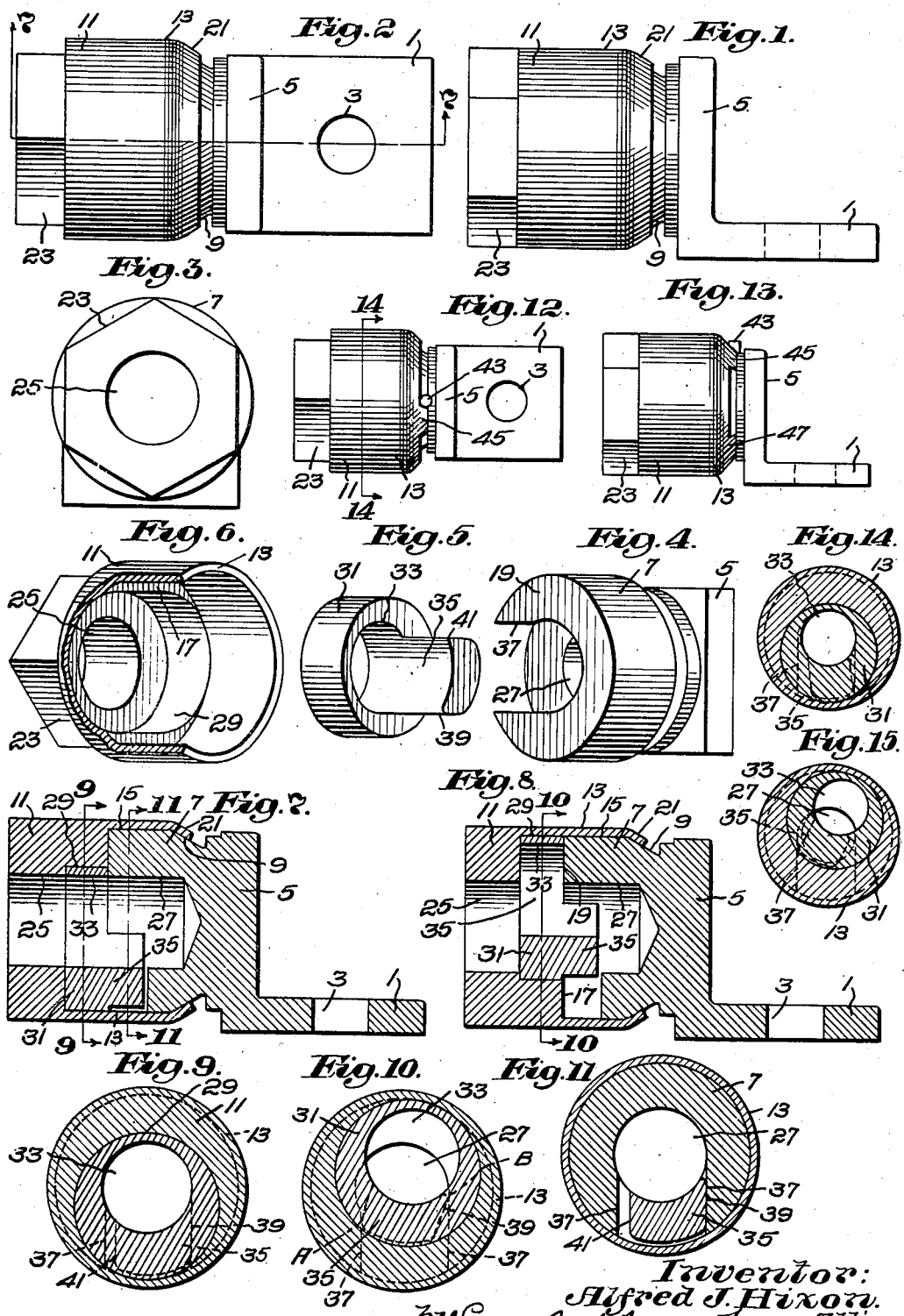

2,093,079

UNITED STATES PATENT OFFICE 2,093,079

CONNECTER FOR ELECTRIC CABLES AND THE LIKE

Alfred J. Hixon, Braintree, Mass.

Application May 16, 1934, Serial No. 725,934

8 Claims. (Cl. 173—269)

My invention relates to devices for the connection of electrical conductors, such as rods, cables, and the like, being particularly suited for use with stranded cables.

The invention, which constitutes an improvement in the type of device disclosed by applicant's Patent 1,989,861, will be best understood from the following description when read in the light of the accompanying drawing of several embodiments of the invention.

In the drawing:—

Fig. 1 is a side elevation of one form of connecter according to the invention;

Figs. 2 and 3 are respectively a plan and end elevation of the connecter according to Fig. 1;

Figs. 4, 5, and 6 are perspective views of the elements which are assembled to form the connecter according to Figs. 1, 2, and 3, parts being broken away in Fig. 6;

Fig. 7 is a section on the line 7—7 of Fig. 2 showing the parts in position to receive a cable or the like;

Fig. 8 is a section corresponding to Fig. 7 with the parts moved to a different operative position to grip the cable;

Fig. 9 is a section on the line 9—9 of Fig. 7;

Fig. 10 is a section on the line 10—10 of Fig. 8;

Fig. 11 is a section on the line 11—11 of Fig. 7;

Figs. 12 and 13 are respectively a plan and side elevation of a modified form of connecter according to the invention;

Fig. 14 is a section on the line 14—14 of Fig. 12 with the parts in position to receive the cable; and Fig. 15 is a section corresponding to Fig. 14 with the parts moved to a different operative position to grip the cable.

Referring to Figs. 1 to 11 of the drawing, the connecter illustrated comprises a base member in the form of an angle bracket, one leg 1 of which latter is perforated at 3 for receiving a bolt or other fastening member for securing the connecter to a bus-bar or other part or instrument to be placed in electrical communication with a stranded cable or other conductor secured to the connecter. As shown, the other leg 5 of the angle bracket base is provided with a laterally projecting boss 7 having, adjacent the leg 5, a reduced diameter portion 9 of frusto-conical shape. It will be understood, however, that, when desired, the base may have a shape other than that of an angle bracket, and, in general, this part of the device may be varied to adapt the connecter for use in various situations for which terminal lugs are commonly employed.

As illustrated, the connecter is provided with an outer member 11 which is recessed at one end to form a sleeve 13 fitting over the cylindrical surface portion 15 of the boss 7, the bottom surface 17 of the recess in the member 11 fitting against the end face 19 of the boss 7 in the assembled device. As shown, for retaining the member 11 in assembled relation with the member 7, the end portion 21 of the sleeve 13 is swaged or bent to conform with the frusto-conical surface 9, so that the members 7 and 11 are rotatable relative to each other but are permanently restrained against substantial axial displacement. For enabling the parts to be readily relatively rotated, the member 11 is conveniently formed at its outer end with a hexagonally shaped portion 23 for receiving the jaws of a wrench, while, when necessary, the angle bracket, or such other base as may be provided, may be gripped with a second wrench.

As shown, the members 11 and 7 are provided with aligned axial bores 25 and 27, while the portion of the member 11 adjacent the end face 17 thereof is provided with an eccentric counterbore 29 in which is rotatably mounted an eccentric 31 having an eccentrically positioned bore 33. The parts are so formed that when they are in the relative positions shown by Figs. 7, 9, and 11 the bore 33 of the eccentric will be in registry with the bores 25 and 27 to permit the ready insertion of a cable in said bores. When the parts are in the relative positions shown by Figs. 8 and 10, the bore 33 is moved out of alignment with the bores 25 and 27 to cause the inserted cable to be gripped to the connecter.

As shown, the eccentric 31 is provided with a laterally extending lug 35 which is received in a longitudinally extending slot 37 formed in the member 7. In the construction illustrated by Figs. 7 to 11 inclusive the parts are so proportioned that when they are in the relative positions illustrated by Figs. 7, 9, and 11 the right hand wall 39 of the lug 35, as viewed in Figs. 9 and 11, rests against the corresponding wall of the slot 37, while the left hand wall 41 of the lug, as viewed in Figs. 9 and 11, is in spaced relation to the corresponding wall of the slot 37. With the parts in the position shown by Fig. 9, rotation of the member 11 in a clockwise direction relative to the member 7 will cause the left hand side 41 of the lug to move into contact with the corresponding side of the slot 37 and the eccentric 31 to be thus cammed toward its position shown by Fig. 10, the motion of the eccentric being approximately gyratory, that is to say, approximately without axial rotation relative to the member 7. When the parts are in the position shown by Fig. 9 the right hand side wall of the slot 37 acts as a stop cooperating with the right hand side 39 of the lug to prevent rotation in a counter-clockwise direction. When the parts have been moved to the position shown by Fig. 10 the lower end of the left hand side of the lug 35 bears against the corresponding wall of the slot 37 at the point indicated at A, while the right hand side 39 of the lug bears against the corresponding side of the slot, or the continuation of the side of the slot formed by the bore 27, at the point indicated at B. This prevents further movement in a clockwise direction. Turning of the member 11 relative to the member 7 in a counter-clockwise direction when the parts are in their positions shown by Fig. 10 will move the parts back into their positions shown by Fig. 9.

The form of the invention just described, in which the walls of the slot 37 cooperate with the lug 35 to act as a stop to determine the two extreme limits of relative movement between the members 7 and 11, at one of which limits the bore 33 of the eccentric is in alignment with the bores 25 and 27 and at the other limit said bore is approximately at its maximum distance out of alignment with the other bores, is particularly adapted for the larger sizes of connecters. With smaller sizes of connecters, such as illustrated by Figs. 2 and 3, or with the larger sizes if desired, instead of relying upon the cooperation of the lug and slot to provide stops, the member 7 may be provided with a stop pin 43 and the sleeve 13 of the member 11 with lugs 45 and 47 which cooperate with said pin to determine the limits of relative movement between the members 7 and 11. With this latter construction, for convenience of manufacture, and as illustrated by Figs. 14 and 15, when the parts are in the position shown by Fig. 14 the lug 35 may clear both sides of the slot 37, the action of the device however being otherwise the same.

In the present forms of the invention, the relatively narrow slot 37 causes the member 7 to afford a large cylindrical bearing surface for the sleeve 13. As the lug 35 and corresponding lower portion of the bore 33 of the eccentric move toward the upper half of the bores 25 and 27 when the cable is gripped, this in conjunction with the large bearing surface effectively eliminates any tendency of the sleeve 13 to tilt on the boss 7. Further, because the lug projects from the wide portion of the end face of the eccentric cable gripper an extremely durable construction is presented.

It will be understood that the embodiments of the invention illustrated constitute but two specific forms of the invention, and that wide deviations may be made from these forms without departing from the spirit of the invention.

I claim:

1. A device of the character described having, in combination, a pair of generally aligned, relatively rotatable members restrained against axial separation under axially directed forces and formed with aligned perforations for receiving a cable or the like, a cable gripper operatively mounted on one of said members for rotation on an axis eccentric to the axis of rotation of said members, the other of said members having a longitudinally extending slot opening laterally into the perforation thereof, said gripper having an opening eccentric to its axis of rotation and having a longitudinally projecting lug received by said slot; said lug adjacent said opening of said gripper being of less width than said slot adjacent said perforation into which said slot opens and of width adjacent said opening less than the diameter of said perforation and adapted to cooperate with the side walls of said slot when said members are relatively rotated, whereby to cause, when said members are relatively rotated, said gripper to move transversely of said perforations and said lug to move into and out of the perforation into which said slot opens.

2. A device of the character described having, in combination, a pair of relatively rotatable members restrained against axial separation one at least of which is mounted on the other and is formed with a perforation for receiving a cable or the like, a cable gripper having an exterior cylindrical bearing surface and an opening for receiving a portion of the cable received by said perforation, which opening is situated eccentrically of the axis of said bearing surface so as to present substantially wider areas at one side of said opening than at the opposite side thereof on the end faces of said gripper, said gripper also having a lug projecting from one of said end faces thereof at the wider area portion of said face, one of said members being formed with an interior cylindrical bearing surface eccentric to the axis of relative rotation of said members on which bearing surface said gripper through its exterior bearing surface is rotatably mounted, and the other of said members having a longitudinal extending recess for receiving said lug opening laterally into the perforation thereof, said lug adjacent said opening of said gripper being of less width than said recess adjacent said perforation into which said recess opens and of width adjacent said opening less than the diameter of said perforation.

3. A device of the character described having, in combination, a pair of generally aligned, relatively rotatable members one at least of which is formed with a perforation for receiving a cable or the like, means restraining said members against axial separation under axially directed forces, a cable gripper formed with an opening for receiving a portion of the cable received by said perforation and having a longitudinally projecting lug, said gripper being operatively mounted on one of said members for rotation on an axis eccentric to the axis of rotation of said members, the other of said members being formed with a slot for receiving said lug whereby relative rotation of said members will cause rotation of said gripper on its eccentric axis relative to the member on which it is mounted to move the opening of said gripper laterally relative to said perforation, said slot being of such width relative to the width of said lug as to cause a wall of said slot to act as a stop cooperating with said lug to determine the limit of rotation of said gripper in one direction.

4. A device of the character described having, in combination, a pair of generally aligned, relatively rotatable members restrained against axial separation under axially directed forces, one at least of which is formed with a perforation for receiving a cable or the like, a cable gripper formed with an opening for receiving a portion of the cable received by said perforation and having a longitudinally projecting lug, said gripper being operatively mounted on one of said members for rotation on an axis eccentric to the axis of rotation of said members, the other of said members being formed with a slot for receiving said lug whereby relative rotation of said members will cause rotation of said gripper on its eccentric axis relative to the member on which it is mounted to move the opening of said gripper laterally relative to said perforation into and out of substantial alignment therewith, said slot being of such width relative to the width of said lug as to cause a wall of said slot to act as a stop for said gripper when said opening and perforation are in alignment.

5. A device of the character described having, in combination, a pair of generally aligned, relatively rotatable members restrained against axial separation under axially directed forces, one at least of which is formed with a perforation for receiving a cable or the like, a cable gripper formed with an opening for receiving a portion of the cable received by said perforation and having a longitudinally projecting lug, said gripper being operatively mounted on one of said members for rotation on an axis eccentric to the axis of rotation of said members, the other of said members being formed with a slot for receiving said lug whereby relative rotation of said members will cause rotation of said gripper on its eccentric axis relative to the member on which it is mounted to move the opening of said gripper laterally relative to said perforation, said slot being of such width relative to the width of said lug as to cause the walls of said slot to act as stops cooperating with said lug to determine the limits of rotation of said gripper in opposite directions.

6. A device of the character described having, in combination, a pair of generally aligned, relatively rotatable members restrained against axial separation under axially directed forces, one at least of which is formed with a perforation for receiving a cable or the like, a cable gripper formed with an opening for receiving a portion of the cable received by said perforation and having a longitudinally projecting lug, said gripper being operatively mounted on one of said members for rotation on an axis eccentric to the axis of rotation of said members, the other of said members being formed with a slot for receiving said lug whereby relative rotation of said members will cause rotation of said gripper on its eccentric axis relative to the member on which it is mounted to move said opening into and out of registry with said perforation, said slot being of such width relative to the width of said lug as to cause the walls of said slot to act as stops cooperating with said lug to determine the limits of rotation of said gripper corresponding substantially to said opening being in registry with said perforation and the maximum distance out of registry therewith respectively.

7. A device of the character described having, in combination, a pair of axially aligned, relatively rotatable members restrained against axial separation one of which is recessed for receiving the other, said members formed with aligned axial perforations for receiving a cable or the like, a cable gripper comprising a disk-like body having a cylindrical exterior surface mounted for rotation in a cylindrical recess formed in one of said members eccentrically thereof, said disk-like body having an eccentrically positioned opening and having a lug longitudinally projecting from a face of said disk at the wider portion of the surface thereof defined by the edges of said opening and said cylindrical surface, the height of said lug radially of said disk being substantially the radial width of said portion, and the surface of which lug adjacent said opening constitutes substantially a continuation of the surface of said opening, the other of said members having a longitudinally extending slot opening laterally into the perforation of said member of greater width than the width of said lug for receiving the same, said lug cooperating with the side walls of said slot for enforcing movement of said gripper transversely relative to the axis of relative rotation of said members when the latter are relatively rotated, said lug adjacent said opening of said gripper being of less width than said slot adjacent said perforation into which said slot opens and of width adjacent said opening less than the diameter of said perforation into which said slot opens.

8. A device of the character described having, in combination, a pair of axially aligned, relatively rotatable members restrained against relative axial movement one of which is recessed for receiving the other, said members formed with aligned axial perforations for receiving a cable or the like, a cable gripper comprising a disk-like body having a cylindrical exterior surface mounted for rotation in a cylindrical recess formed in one of said members eccentrically thereof, said disk-like body having an eccentrically positioned opening and having a lug longitudinally projecting from a face of said disk at the wider portion of the surface thereof defined by the edges of said opening and said cylindrical surface, the height of said lug radially of said disk being substantially the radial width of said portion, and the surface of said lug adjacent said opening constituting substantially a continuation of the surface of said opening, and the other of said members having a longitudinally extending slot opening laterally into the perforation of said member and receiving said lug, said lug cooperating with the walls of said slot for enforcing movement of said gripper transversely relative to the axis of relative rotation of said members when the latter are relatively rotated, said lug adjacent said opening of said gripper being of less width than said slot adjacent said perforation into which said slot opens and of width adjacent said opening less than the diameter of said perforation into which said slot opens.

ALFRED J. HIXON.